United States Patent [19]

DeRango et al.

[11] Patent Number: 5,341,398
[45] Date of Patent: Aug. 23, 1994

[54] METHOD FOR REPEATERS TO ADAPTIVELY DIGITALLY CODE RECEIVED ANALOG INFORMATION

[75] Inventors: Mario F. DeRango, Lake Zurich; Richard L. Bennett, Schaumburg, both of Ill.

[73] Assignee: Motorola, Inc., Schaumburg, Ill.

[21] Appl. No.: 22,229

[22] Filed: Feb. 25, 1993

[51] Int. Cl.$^5$ .................... H04B 17/02; H04B 1/40; H04L 27/00
[52] U.S. Cl. ..................................... 375/3.1; 375/3; 375/5; 455/74
[58] Field of Search ............... 375/3, 3.1, 5, 10, 122; 455/74, 78, 89, 110

[56] References Cited

U.S. PATENT DOCUMENTS

| | | | |
|---|---|---|---|
| 4,377,860 | 3/1983 | Godbole | 375/5 |
| 4,682,123 | 7/1987 | Loper et al. | 455/110 |
| 5,109,525 | 4/1992 | Nichols | 375/5 |

*Primary Examiner*—Stephen Chin
*Assistant Examiner*—Amanda T. Le
*Attorney, Agent, or Firm*—Timothy W. Markison; Steven G. Parmelee

[57] ABSTRACT

Adaptive digital coding of received analog information based on signal strength can be accomplished in the following manner. Once a repeater receives analog information from a communication unit, the signal quality of the received analog information is determined. Next the signal quality of the received analog information is compared with a first signal quality value. If the signal quality of the received analog information is above the first signal quality value, the received analog information is digitally coded based on a first digital coding format. If the signal quality of the received analog information is below the first signal quality value, the received analog information is digitally coded based on a second digital coding format.

17 Claims, 4 Drawing Sheets

1

METHOD FOR REPEATERS TO ADAPTIVELY DIGITALLY CODE RECEIVED ANALOG INFORMATION

FIELD OF THE INVENTION

This invention relates generally to digital coding of analog information and, in particular, to adaptive digital coding of analog information.

BACKGROUND OF THE INVENTION

Communication systems are known to comprise a plurality of communication units, repeaters, and dispatcher stations. The repeaters and dispatcher stations are physically connected together via a data link, such as a local area network (LAN). The communication units may either be digital communication units (transceive digital information) or analog communication units (transceive analog information). The digital communication units, because they transmit digital information, are able to communicate on a digital infrastructure directly, while analog communication units, because they transmit analog information, are incompatible with a digital infrastructure. For this reason, an analog communication unit cannot function in a digital infrastructure unless the received analog information is digitized before placement on the LAN and then decoded back to an analog signal before transmission to a receiving analog communication unit.

One implementation, which permits analog communication units to operate on a digital infrastructure, converts analog signals into a selected digital coding format. The selected digital coding format is typically based on the bandwidth of the digital infrastructure. For example, the selected digital coding format may be 4.8 kbps vector sum excitation linear predictive (VSELP), a Motorola acronym, or 64 kbps pulse coded modulation, (PCM). In general, the more bits used in the digital coding process, the more accurately the analog information can be recaptured. Conversely, the less bits used to digitally code the analog information, the less accurately the analog information can be recaptured. Thus, the 4.8 kbps VSELP digital coding may be fine for strong analog signals (high signal strength or low signal to noise), but may produce distorted representations of weak analog signals (low signal strength or high signal to noise). Consequently, the quality of the digitally coded analog signal may be unacceptable. In contrast, the 64 kbps PCM digital coding provides acceptable digital coding of weak analog signals and strong analog signals but requires substantial infrastructure bandwidth.

While the above works well when the signal quality remains relatively constant, in practice the signal quality tends to vary.

Therefore a need exists for a method of handling analog communication units within a digital infrastructure that adaptively digitally codes received analog signals based on signal strength and minimizing infrastructure bandwidth requirements.

DESCRIPTION OF A PREFERRED EMBODIMENT

Generally, the present invention provides a method and apparatus that allows repeaters in a digital communication system to efficiently support analog communication units. This is achieved by taking a received analog signal and digitally coding it to produce a digital signal. The digital coding may be pulse coded modulation (PCM), adaptive differential pulse coded modulation (ADPCM), or vector sum excitation linear predictive (VSELP), a Motorola acronym, which is selected based on the quality of the received analog signal.

Figure 1:
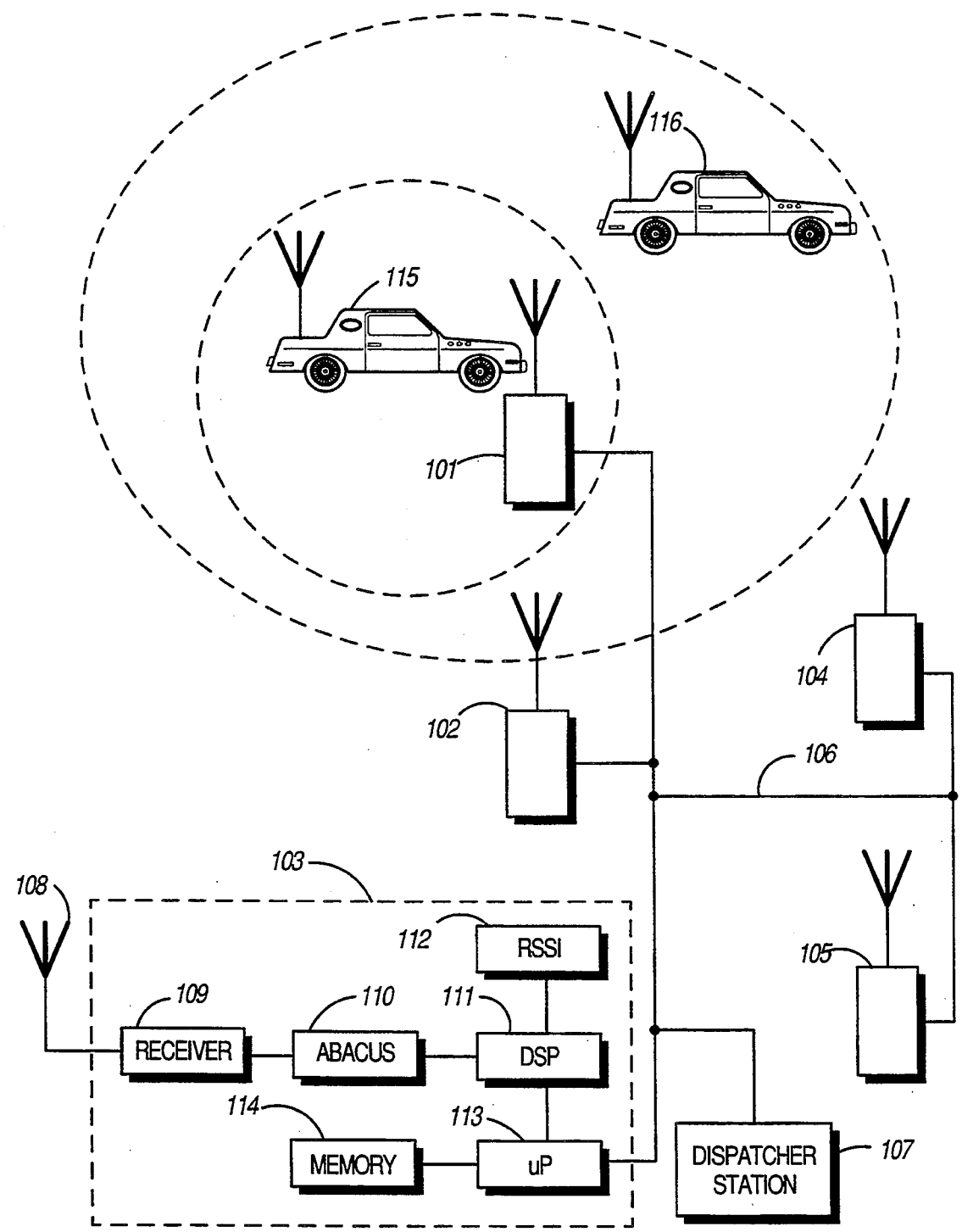
FIG. 1 illustrates a digital communication system in accordance with the present invention.

The present invention can be more fully described with reference to FIGS. 1–3. FIG. 1 illustrates a digital communication system that includes repeaters 101–105, a digital bus 106, a dispatcher station 107, and mobile communication units 115–116. Each repeater 101–105 includes an antenna 108, a receiver 109, an ABACUS, a Motorola acronym, 110, a digital signal processor (DSP) 111, a receive signal strength indication (RSSI) 112, a microprocessor 113, and memory 114. As is known, the digital bus 106 is used to send and receive digital information between repeaters and the dispatcher station in a communication system and may extend over a large geographical area. The ABACUS circuit 110 provides the initial high bit rate analog to digital conversion of the intermediate frequency (IF) signal of the receiver, the DSP is used to demodulate the received signal and further digitally encode/decode the demodulated analog signals. The RSSI function indicates received signal quality of the received analog signal.

Figure 2A:
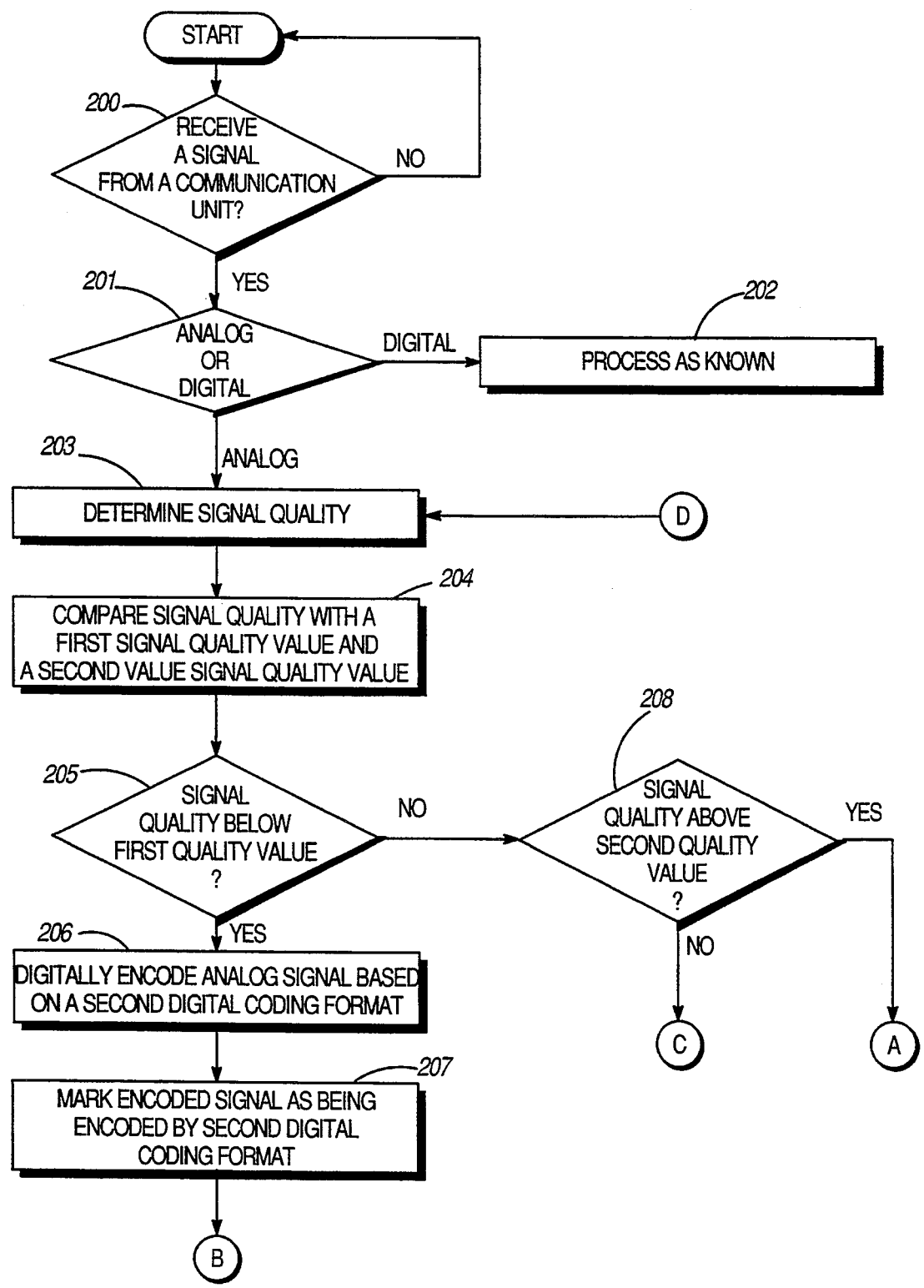
FIGS. 2A and 2B illustrates a logic diagram that may be used to implement the present invention.
Figure 2B:
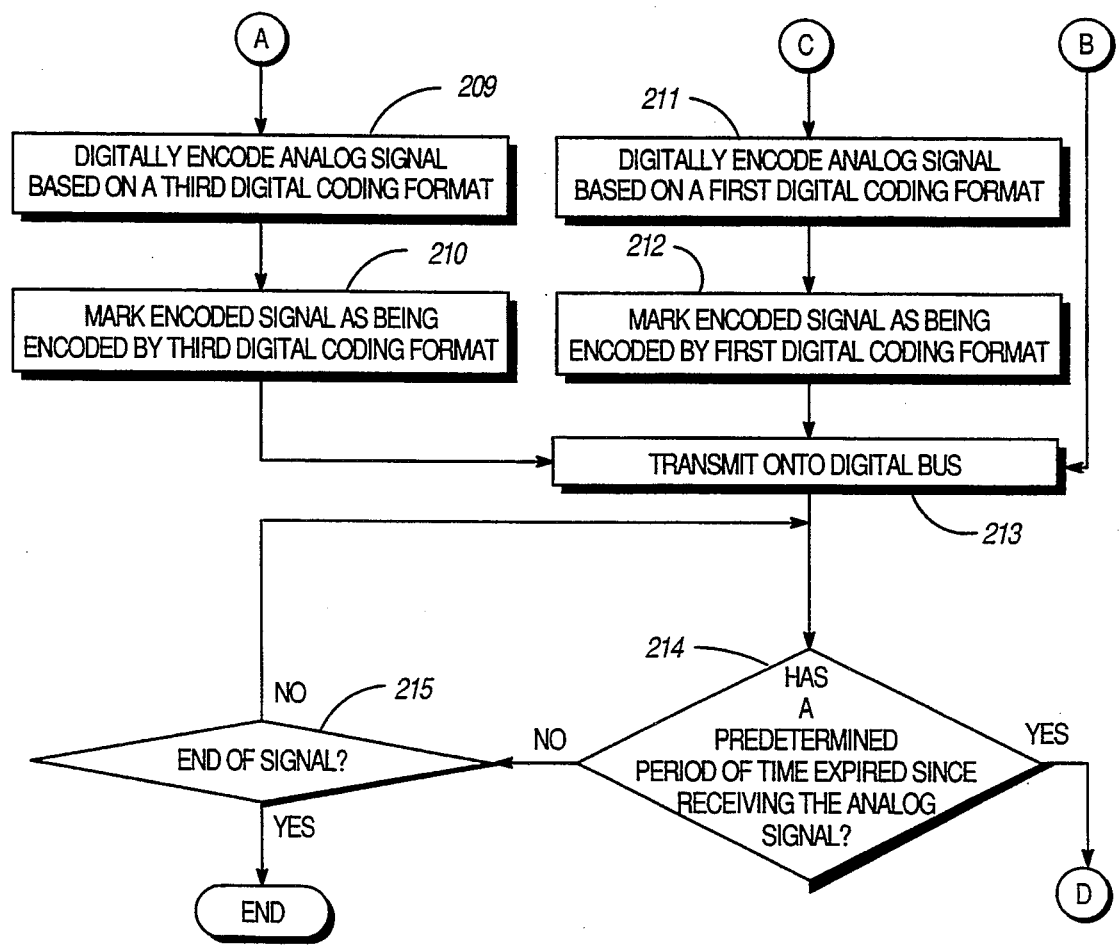

FIGS. 2A and 2B illustrates a logic diagram that a repeater may incorporate to implement the present invention. The process begins when a signal is received from a communication unit 200. A determination is made as to whether the received signal is analog or digital 201. The received signal is digital information, if it is a digitally readable signal. Otherwise it is an analog signal. If the received signal is digital the signal is transmitted onto the digital network in a known manner. The received digital signal may or may not be compressed for purposes of reducing bandwidth before being transmitted onto the digital network 202. In either case, the process is known, thus no further discussion will be presented except to facilitate the understanding of the present invention.

If the received signal is analog, the quality of the received analog information is determined 203. The quality is determined by the RSSI which measures the absolute signal strength of the radio frequency (RF) signal and/or signal to noise power ratio of the same. Next the quality of received analog information is compared with two signal quality threshold values 204. For purposes of this discussion, the two signal quality thresholds will be RF signal to noise ratios of 6 dB and 12 dB plus or minus some hysteresis. If the quality of the received analog information is above the first signal quality value, or 6 dB, 205, and below the second signal quality value, or 12 dB, 208 the received analog information is digitally coded based on a first digital coding format 211, such as 32 kbps ADPCM, and then marked as being digitally coded by the first digital coding format (32 kbps ADPCM) 212. If the quality of the received analog information is below the first signal quality value, or 6 dB, 205 the received analog information is digitally coded based on a second digital coding format 206, such as 64 kbps PCM which requires more bandwidth than 32 kbps ADPCM, and then marked as being digitally coded by the second digital coding format (64 kbps PCM) 207. If the quality of the received analog information is above the first signal quality value, or 6 dB, 205 and above the second signal quality value, or 12 dB, 208 the received analog information is digitally coded based on a third digital coding format 209, such as 4.8 kbps VSELP which requires less bandwidth than 64 kbps PCM and 32 kbps ADPCM, and then marked as being coded by the third digital coding format (4.8 kbps VSELP) 210. After the received analog information has been digitally coded and marked as being digitally coded by a particular digital coding format, the digitally coded signal is transmitted onto the digital bus 213.

Next, a check is done to determine whether a predetermined amount of time has expired since the analog signal has been received 214. The predetermined amount of time, or time interval, is based on the mobility of the communication units. For example, if the communication units have high mobility, the time interval may be one second. On the other hand, if the communication units have low mobility, the time interval may be one minute. Basically, the predetermined time interval may be any time value that is appropriate for the communication system. If the predetermined amount of time has expired, the signal quality of the received analog information is determined again 203. If the predetermined period of time has not expired, the repeater determines whether the analog information is still being received 215. If the analog information is no longer being received, the process ends. If the analog information is still being received, the repeater determines whether the predetermined period of time has expired since receiving the analog information 214 and continues as mentioned above until the analog information is no longer being received. As long as the analog information is being received, the quality of the information will be checked at a predetermined time interval. This is done to allow a different digital coding method to be chosen to digitally code the received analog information if the quality of the information changes during the duration of its transmission.

Figure 3:
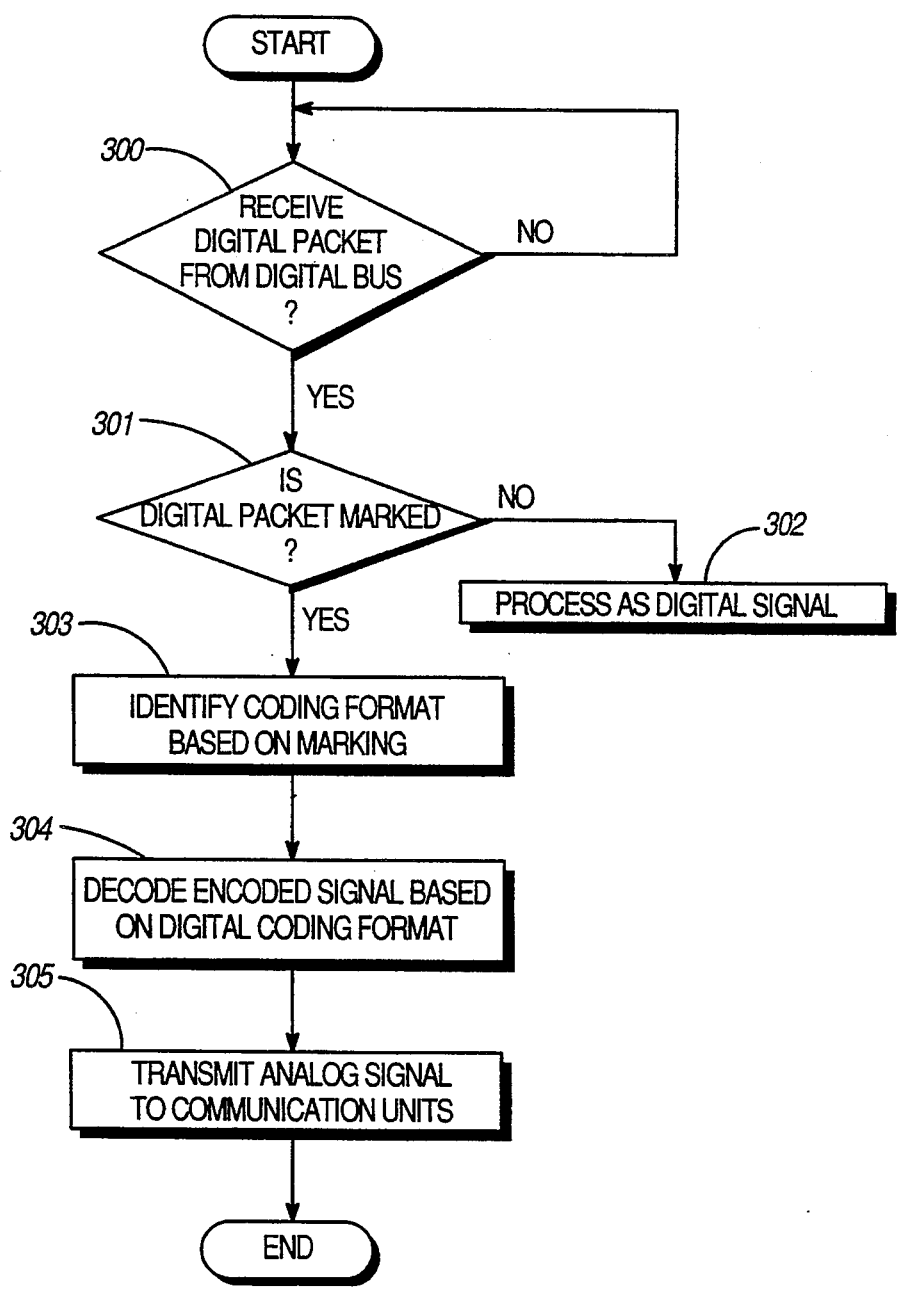
FIG. 3 illustrates a logic diagram that a repeater and a dispatcher station may use to implement the present invention.

FIG. 3 illustrates a logic diagram that a repeater and/or a dispatcher station may use to implement the present invention. The process begins when a digital packet is received from the digital bus 300. Once the digital packet is received, it is checked for marking 301. The marking indicates whether the digital packet was received analog information that has been digitally coded. The marking also indicates the type of digital coding format used to digitally code the analog information. If the received digital packet is not marked, it is transmitted to the communication unit or to the dispatcher station as digital information 302. If the received digital packet is marked, the digital coding format is identified based on the marking 303. Next the received digital packet is decoded based on the digital coding format indicated by the marking to reproduce the analog information 304. Finally, the reproduced analog information is transmitted to other analog communication units 305 to end the process.

The above discussion described two threshold levels, however, to one skilled in the art, it is easily recognizable that multiple threshold levels could be used. For example, a different threshold value could be used to indicate when to digitally code the received analog information using 64 kbps PCM, 32 kbps ADPCM, 16 kbps ADPCM, 8 kbps VSELP, 4.8 kbps VSELP, etc.

By allowing analog information to be digitized and adaptively compressed, the audio quality of the received analog information is maintained throughout a transmission in which the RF signal quality varies. Since most signals are received with an average RF signal quality that permits a high degree of voice coding compression, the present invention minimizes the average bandwidth requirements on the digital bus, while still preserving the audio quality. In this manner, the digital link can accommodate more calls, in general, than when using only one digital coding format such as 64 kbps PCM for all received analog information.

We claim:

1. In a communication system that includes a limited number of repeaters and a plurality of communication units, wherein the limited number of repeaters are operably coupled together via a digital bus, wherein at least a first set of the plurality of communication units transceives analog information with the limited number of repeaters, a method for each of the limited number of repeaters to adaptively digitally code the analog information, the method comprises the steps of:

a) receiving, by a first repeater of the limited number of repeaters, analog information from a communication unit of the first set to produce received analog information;

b) determining, by the first repeater, signal quality of the received analog information;

c) comparing, by the first repeater, the signal quality of the received analog information with a first signal quality value;

d) when the signal quality of the received analog information is above the first signal quality value, digitally coding the received analog information based on a first digital coding format to produce a first digital coded information; and e) when the signal quality of the received analog information is below the first signal quality value, digitally coding the received analog information based on a second digital coding format to produce second digital coded information, wherein the first digital coding format requires less bandwidth than the second digital coding format.

2. In the method of claim 1, use the established digital coding format until a predetermined period of time expires, when the predetermined period of time expires, re-determining a digital coding format to use based on the signal quality of a subsequently received analog information.

3. The method of claim 1 further comprises the steps of:

f) marking, by the first repeater, the first digital coded information as first marked information to indicate that the received analog information was digitally coded by the first digital coding format; and g) marking, by the first repeater, the second digital coded information as second marked information to indicate that the received analog information was digitally coded by the second digital coding format.

4. The method of claim 3 further comprises the steps of:

h) receiving, by a second repeater of the limited number of repeaters, either the first marked information or the second marked information via the digital bus to produce received marked information; and i) decoding, by the second repeater, the received marked information utilizing the first digital coding format when the received marked information is first marked information and utilizing the second digital coding format when the received marked information is second marked information.

5. The method of claim 3 further comprises the steps of:

h) receiving, by a dispatcher station, either the first marked information or the second marked information via the digital bus to produce received marked information, wherein the dispatcher station is operably coupled to the digital bus; and i) decoding, by the dispatcher station, the received marked information utilizing the first digital coding format when the received marked information is first marked information and utilizing the second digital coding format when the received marked information is second marked information.

6. The method of claim 1 further comprises the steps of:

f) comparing the signal quality of the received analog information with a second signal quality value, wherein the second signal quality value is greater than the first signal quality value; and g) when the signal quality of the received analog information is above the second signal quality level, digitally coding the received analog information based on a third digital coding format.

7. The method of claim 1 further comprises:

f) receiving, by the first repeater, digital information transmitted by a communication unit of a second set of the plurality of communication units to produce received digital information; and g) determining, by the first repeater, whether incoming information is the received digital information or the received analog information.

8. In a communication system that includes a limited number of repeaters and a plurality of communication units, wherein the limited number of repeaters are operably coupled together via a digital bus, wherein at least a first set of the plurality of communication units transceives analog information with the limited number of repeaters, a method for a repeater to adaptively digitally code the analog information, the method comprises the steps of:

a) receiving, by the repeater, analog information from a communication unit of the first set to produce received analog information;

b) determining, by the repeater, signal quality of the received analog information;

c) comparing, by the repeater, the signal quality of the received analog information with a first signal quality value;

d) when the signal quality of the received analog information is above the first signal quality value, digitally coding the received analog information based on a first digital coding format to produce a first digital coded information; and e) when the signal quality of the received analog information is below the first signal quality value, digitally coding the received analog information based on a second digital coding format to produce a second digital coded information, wherein the first digital coding format requires less bandwidth than the second digital coding format.

9. The method of claim 8 further comprises the steps of:

f) marking, by the repeater, the first digital coded information as first marked information to indicate that the received analog information was digitally coded by the first digital coding format; and g) marking, by the repeater, the second digital coded information as second marked information to indicate that the received analog information was digitally coded by the second digital coding format.

10. The method of claim 9 further comprises the steps of:

h) receiving, by the repeater, marked information via the digital bus from a another repeater to produce received marked information; and i) decoding, by the repeater, the marked information utilizing the first digital coding format when the received marked information is first marked information and utilizing the second digital coding format when the received marked information is second marked information.

11. The method of claim 8 further comprises the steps of:

f) comparing the signal quality of the received analog information with a second signal quality value, wherein the second signal quality value is greater than the first signal quality value; and g) when the signal quality of the received analog information is above the second signal quality value, digitally coding the received analog information based on a third digital coding format.

12. The method of claim 8 further comprises:

f) receiving, by the repeater, digital information transmitted by a communication unit of a second set of the plurality of communication units, wherein the second set of the plurality of communication units transmits digital information, to produce received digital information; and g) determining, by the repeater, whether incoming information is the received digital information or the received analog information.

13. An improved repeater that is used in a communication system, wherein the communication system includes a limited number of improved repeaters and a plurality of communication units, wherein the limited number of improved repeaters are operably coupled together via a digital bus, wherein at least a first set of the plurality of communication units transceives analog information with the limited number of improved repeaters, wherein the improvement comprises:

first receiving means for receiving analog information from a communication unit of the first set;

first determining means, operably coupled to the first receiving means, for determining signal quality of the analog information;

first comparing means, operably coupled to the first determining means, for comparing the signal quality of the analog information with a first signal quality value;

first digital coding means, operably coupled to the first receiving means and the first comparing means, for digitally coding the analog information based on a first digital coding format to produce a first digital coded information when the signal quality of the received analog information is above the first signal quality value; and second digital coding means, operably coupled to the first receiving means and the first comparing means, for digitally coding the analog information based on a second digital coding format to produce a second digital coded information when the signal quality of the received analog information is below the first signal quality value wherein the first digital coding format requires less bandwidth than the second digital coding format.

14. The improved repeater of claim 13 further comprises:

marking means, operably coupled to the first digital coding means and the second digital coding means for marking the first digital coded information as first marked information to indicate that the received analog information was digitally coded by the first digital coding format and for marking the second digital coded information as second marked information to indicate that the received analog information was digitally coded by the second digital coding format.

15. The improved repeater of claim 14 further comprises:

second receiving means, operably coupled to the digital bus, for receiving marked information from another repeater in the communication system via the digital bus to produce received marked information; and decoding means, operably coupled to the second receiving means, for decoding the received marked information utilizing the first digital coding format when the received marked information is first marked information and utilizing the second digital coding format when the received marked information is second marked information.

16. The improved repeater of claim 13 further comprises:

second comparing means, operably coupled to the first determining means, for comparing the signal quality of the received analog information with a second signal quality value, wherein the second signal quality value is greater than the first signal quality value; and third digital coding means, operably coupled to the first receiving means, for digitally coding the received analog information based on a third digital coding format when the signal quality of the received analog information is above the second signal quality value.

17. The improved repeater of claim 15 further comprises:

third receiving means for receiving digital information transmitted by a communication unit of a second set of the plurality of communication units, wherein the second set of the plurality of communication units transmits digital information; and second determining means, operably coupled to the third receiving means, for determining whether incoming information is the received analog information or digital information transmitted by the communication unit of the second set.

* * * * *